United States Patent Office 3,280,214
Patented Oct. 18, 1966

3,280,214
ORGANOSILOXANE BLOCK COPOLYMERS
Darrell D. Mitchell, Midland, Mich., assignor to Dow Corning Corporation, Midland, Mich., a corporation of Michigan
No Drawing. Filed Sept. 18, 1963, Ser. No. 309,867
15 Claims. (Cl. 260—825)

This invention relates to a new and improved organopolysiloxane copolymer, and more specifically to a method for making same. This method for making organopolysiloxane copolymers satisfies the need for a single method of producing a wide range of specific block copolymers of organopolysiloxanes.

Generally the prior art taught organopolysiloxane copolymers which were made by methods which produced random copolymers. The random copolymers, although made from monomers which each had at least one desirable property, would not have properties intermediate to the two homopolymers. An example would be to copolymerize monomer A which normally gave a hard and brittle film with monomer B that normally would give a soft and flexible film. The object of such copolymerization was to produce a copolymer with properties intermediate to the homopolymers A and B, for example, to give a copolymer giving a hard and flexible film. However, it was found the copolymer would generally be brittle or would still be soft, and the desired intermediate properties would not be obtained. Some improvements might be realized such as the hard and brittle polymer might be more flexible, but only marginally so.

Prior art in the field of organic polymers shows that, if a regular order of monomers in the polymer or copolymer chain occurs, the final polymer or copolymer has entirely new properties in contrast to the random order copolymers. Although the same monomers and percentages of monomers make up the composition of the random order copolymer and the regular order copolymer, the final polymers in each case differ widely in properties. Also in homopolymers where all bonding between monomers is head to tail, for instance, instead of some head to tail, some head to head and some tail to tail without any order, the final homopolymer has new properties. Much of the time it is difficult, expensive and sometimes impossible to produce the desired regular order of monomers in the polymer chains because it is the nature of the specific monomers involved in such a polymerization to react to produce random order copolymers.

The development of silicon-containing block copolymers has furthered the art in producing improved properties with less difficulty, less expense and a better chance of forming an order in the copolymer chain resulting in improved properties. Still the silicon-containing block copolymers have not achieved the theoretically ultimate siloxane polymer. Many of the building blocks which would be desirable in a siloxane polymer cannot be used because the blocks are not soluble in one another, resulting in a two phase system of unusable product.

It is an object of this invention to provide a method for making new organopolysiloxane block copolymers. Novel regular order block copolymers which can be cured under ordinary conditions to either resins or rubbers are also sought. Another object is a new and improved organopolysiloxane block copolymer. A further object is a method of copolymerizing siloxanes whereby previously incompatible silicon-containing segments are made compatible and useful polymers result.

This invention relates to a method for producing a silicon-containing block copolymer consisting essentially of (A) reacting (1) 5 to 99 mol percent of an organopolysiloxane of the general formula

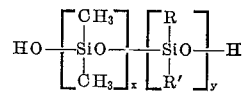

wherein each R and each R′ is selected from the group consisting of methyl, ethyl, phenyl and vinyl radicals, $x$ is an integer of from 5 to 400 inclusive, $y$ is an integer of from 0 to 40 inclusive, there being no more than 10 mole percent organosiloxane units other than methyl-containing siloxane units in the polymer, the siloxane containing an average of from 1.9 to 2.0 organo groups per silicon atom, having a viscosity range of from 25 to 1,000,000 centipoises at 25° C. and an amount of a suitable organic solvent from that portion necessary for the final solids concentration which is an amount of from 5 to 60 percent by weight and (2) an amount of at least one of the following molecules per hydroxyl group of (1) a silicon-containing compound of the general formula $Y\text{—SiX}_3$ wherein Y is selected from the group consisting of halogen atoms,

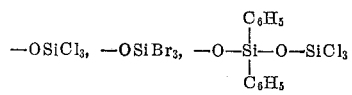

and $\text{—SiCl}_3$ and X is a halogen atom and containing an amount of a suitable organic solvent from that portion necessary for the final solids concentration which is an amount of from 5 to 60 percent by weight, in the presence of an acid acceptor and the above reaction continues until complete, (B) adding from 1 to 95 mole percent (3) of a silicon-containing compound selected from the group consisting of (a) a silane of the general formula $R''\text{SiX}_3$ wherein R″ is selected from the group consisting of aryl, alkaryl and halogenoaryl radicals, and X is a halogen atom, (b) a hydrolysis product of (a), and (c) mixtures thereof; (c) hydrolyzing at a temperature of from 25° to 175° C. in water containing enough hydrogen halide to have a solution of from 0.01 to 30 percent by weight, (D) the organopolysiloxane-organic phase is separated from the aqueous phase, the organic phase is neutralized and azeotroped dry, (E) the dried organopolysiloxane solution is made compatible by adding a silicon-bonded hydroxyl condensation catalyst, refluxing and then neutralizing, (F) the above composition is concentrated by driving off the solvent by conventional means and adding a curing catalyst and then curing.

It is important that the addition of the reactants be kept in the designated order to produce the desired copolymer. More significant is producing a higher degree of functionality at the ends of the polymer block having an average of from 1.9 to 2.0 inclusive, preferred 1.98 to 2.0 inclusive, organic groups per silicon atom. A critical order is the reaction of the polymer block having an average of from 1.9 to 2.0 inclusive organic groups per silicon atom with a silicon-containing material having four or more halogen atoms per molecule. The omission of the above reaction step or the change in the order of additions of reactants will not allow this invention to operate within the specified limits.

The organosiloxane having an average of from 1.9 to 2.0 inclusive Si—C linkages per silicon atom is of the general formula

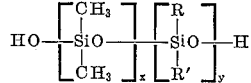

wherein each R and each R′ is selected from the group consisting of methyl, ethyl, phenyl and vinyl radicals. Small amounts of other organosiloxane units can be present without interfering with the function of this invention. The amounts of such organosiloxane units must not allow the number of Si—C linkages to fall outside the 1.9 to 2.0 linkages per silicon atom range. The organic radicals attached to silicon designated as R and R' can be the same or different on the same silicon atom. Examples of the RR'SiO units are as follows:

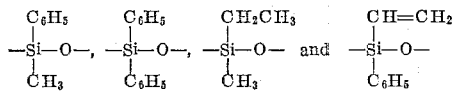

Small amounts of other organosiloxane units can be present in amounts not exceeding a total of two mole percent. These groups are not essential to the invention, but are not detrimental if present within the designated limits. The units can be any of the following type $R'''SiO_{3/2}$, $R'''_2SiO$ and $R'''_3SiO_{1/2}$ wherein $R'''$ is selected from a group consisting of hydrogen, alkyl, aryl, cycloalkyl, alkenyl, cycloalkenyl, halogenoalkyl, halogenoaryl, and cyanoalkyl radicals. Specific examples of the alkyl radicals are methyl, propyl, butyl and octadecyl; for aryl radicals, phenyl, tolyl and naphthyl; for cycloalkyl radicals, cyclopentyl and cyclohexyl; for alkenyl radicals, vinyl and propenyl; for cycloalkenyl radicals, cyclohexenyl; for halogenoalkyl radicals, chloropropyl, perfluoropropyl, perchloroethyl and chlorohexyl; and for cyanoalkyl radicals, cyanoethyl.

The amount of the organopolysiloxane of the general formula

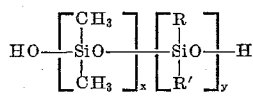

is from 5 to 99 mole percent. The total range is operable but a more preferred range is from 10 to 99 mole percent. The most preferred range is from 20 to 90 mol percent. The optimum range is 40 to 90 mole percent. The range of $x$ is from 5 to 400 with a more preferred range from 10 to 325. The range of $y$ is from 0 to 40, with a more preferred range from 0 to 30. When the sum of $x+y$ is between 5 and 95 a resinous product is obtained. The optimum range of the diorganopolysiloxane for the above range of $x+y$ is from 10 to 80 mole percent and the range of the mono-organosilicon-containing material is from 20 to 90 mole percent. This material when cured is useful for fluid bed powders, coating powders, laminates, films from solvents, cloth coatings and molding compounds. When the sum of $x+y$ is between 110 and 400 a rubber product is obtained. The optimum range of the diorganopolysiloxane for this range of $x+y$ is from 70 to 95 mole percent and the range of the monoorganosilicon-containing material is from 5 to 30 mole percent. The rubbery products are useful as any of the silicone rubber stocks for such purposes as shock-resistant material, electrical insulation, gasketing, cloth coatings, and sealing compounds. The sum of $x+y$ between 110 and 195 is particularly useful for blending with either resinous or rubbery organosiloxane stocks to improve their properties. The resinous stocks increase in flexibility while the rubbery stocks gain added strengths. The number of silicon atoms in the organopolysiloxane with 1.9 to 2.0 Si—C linkages per silicon atom is not necessarily limited to the range of 5 to 440 as stated above, and may be varied to lie outside this range.

One critical feature of the organosiloxane is that it must contain at least two silicon attached hydroxyl groups per molecule. The number of hydroxyl groups per molecule should not exceed 40 per molecule even with the larger molecules. The viscosity range, which is not critical, should be between 25 and 1,000,000 centipoises at 25° C.

The above organopolysiloxane is diluted to a suitable concentration with an organic solvent. The amount of the solvent used should be approximately half of the total amount of solvent necessary to make the final desired concentration which may be from 5 to 60 percent solids by weight. As the same solvent is conventionally used for both the diorganopolysiloxane block (1) and the silicon-containing coupling agent (2) in the coupling reaction, step (A), the qualification for using one-half the total amount for each solution is not critical. No advantage is seen either when the two solutions contain equal portions of organic solvent or when the two solutions contain widely varying amounts of organic solvent. Approximately one-half of reactants (1) and (2) in each solution is a convenient technique.

The solvent should be essentially free of moisture, immiscible with water, and non-reactive toward any of the ingredients. Some of the suitable organic solvents are heptane, cyclohexane, benzene, toluene, xylene, naphtha, mineral spirits, perchloroethylene, chlorobenzene, diethyl ether, and butyl acetate. The above list is considered as representative of the suitable organic solvents operable in this invention. The choice of solvent will be determined by other preparation criterion, such as reflux temperature, activity of the catalyst, length of reflux, solubility of reactants and the like.

The coupling agent or linking compound which links or couples the diorganopolysiloxane (1) with the mono-organosilicon-containing compound (a), (b) or (c) is a polyfunctional halogen containing silicon compound of the general formula Y—SiX₃ wherein Y is selected from the group consisting of halogen atoms,

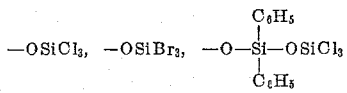

and —SiCl₃ and X is a halogen atom. The coupling agent is a critical component of this method and the resulting block copolymers and is essential to the operation of the instant invention. The essential feature of the coupling agent is its polyfunctionality. The polyhalogen silicon compound permits the invention to be operable throughout the specified limits herein disclosed. Other than the above described coupling agent can operate according to this invention. The coupling agent must be present to the extent of at least one coupling molecule per hydroxyl group of the diorganopolysiloxane (1). No critical upper limit is on the amount of coupling agent employed is known.

The two silicon containing reactants, (1) and (2) in solution are mixed in the presence of an acid acceptor. The reaction is stirred until the reaction has been completed. The length of time the mixture is stirred is not critical and can vary over a wide range, from as short as 1 to 10 minutes to 5 to 10 hours. Although the reaction is usually complete within 30 minutes, longer periods of time such as 1 or 2 hours often are used. For reasons of economy the reaction time is usually held between 10 and 60 minutes. Heat is usually not applied to promote reaction and is not a critical factor.

The term acid acceptor applies to a broad range of compounds which will form a complex with acids such as HCl in a non-aqueous system. Most of these acid acceptors are nitrogen containing organic compounds, but others such as phosphorus and boron organic compounds can be used. Examples of some of the most applicable acid acceptors are pyridine, picolines, morpholine, tributylamine, tertiary amines in general, and dry ammonia.

The amount of acid acceptor is not critical in this invention as will be shown by the following method variables. The amount of acid acceptor depends on the chain length of the hydroxy-endblocked diorganopolysiloxane and its hydroxyl content. One hydrogen in each hydrogen halide molecule is derived from one hydroxyl of the diorganopolysiloxane, therefore the amount of acid acceptor depends directly on the chain length and/or hydroxyl content of the diorganopolysiloxane. If this was the only criterion the amount could be easily calculated, but this is not the case. An acid solution is usually used for the hydrolysis of the diorganopolysiloxane endblocked with a polyfunctional silicon-bonded halogen compound with a mono-organotrihalogenosilane, its hydrolyzate or mixtures of the two. The amount of acid necessary for the hydrolysis is from 0.01 to 30 percent by weight of the water used. Also the molecular weight of the acid acceptor will determine the amount used. Immediately, one is obviously confronted with three or four variables which can vary over broad ranges, thus each system to be used will define its own acid acceptor concentration.

After the above reaction has been completed (a) a silane, (b) a hydrolyzed product of the silane (a), or (c) a mixture of the silanes (a) and the hydrolysis product (b) is added. The silane (a) has the general formula $R''SiX_3$ wherein $R''$ is selected from the group consisting of aryl, alkaryl, and halogenoaryl radicals and X is a halogen atom. Examples of $R''$ as aryls are phenyl and naphthyl, as alkaryls are tolyl and xylyl, and as halogenoaryls are chlorophenyl and bromophenyl. The silane (a) can be either a relatively pure halogenosilane such as phenyltrichlorosilane or it can be a mixture of silanes. The hydrolyzed products of silanes (a) contain the same organo radicals as the silanes, therefore mixtures of silanes described under (a) above can be hydrolyzed and used in this invention. Two or more silicon-bonded hydroxyl groups per molecule and preferably more than two are required in (b). The mixtures of (a) and (b) have the same requirements as (a) and (b).

The amount of the above silicon-containing compound (a), (b) or (c) of (3) is from 1 to 95 mole percent. A more preferred range is from 5 to 90 mole percent. The optimum range of (a), (b) or (c) with a diorganopolysiloxane of $x+y$ equal to from 5 to 95 is 20 to 90 mole percent and with a diorganopolysiloxane of $x+y$ equal to from 110 to 400 is 5 to 30 mole percent.

The coupled diorganopolysiloxane and polyfunctional silicon-containing compound is hydrolyzed with the above described silicon-containing compound (a), (b) or (c) in the presence of water. The amount of water necessary is at least one water molecule per silicon-bonded halogen. The maximum amount of water employed is not critical, although extremely large excesses of water are impractical. The reactions which produce acidic by-products should have enough water added to produce an aqueous solution of the acid between 0.01 and 30 percent by weight. A more preferred range is between 1 and 20 percent by weight with the optimum range from 5 to 15 percent by weight. If the reactions do not produce enough acid by-product, the addition of a condensation catalyst, such as HCl, $H_2SO_4$ and $CH_3COOH$ is required. The condensation catalyst preferred is HCl, but can be any of the well known catalyst for condensation of silicon-bonded hydroxyl groups. These condensation catalysts may be of the group described below. The hydrolysis mixture is agitated until completion. The temperature for hydrolysis varies from 25° to 175° C. depending upon the type of reactants, the catalyst system, the solvent used, and economic factors. The time for completion will depend upon the reaction system and specifically the temperature. The best results are obtained with a temperature range of from 60° to 85° C.

The organic phase containing the polysiloxane is separated from the aqueous phase by conventional means. The separation can be most practically carried out by decantation. After the separation, the organic phase is neutralized by washing with water, dilute $NaHCO_3$, $Na_2CO_3$ and the like. It is then azeotroped dry or dried with such materials as anhydrous $Na_2CO_3$, $Na_2SO_4$ and $K_2CO_3$. The temperature of the azeotrope will necessarily depend upon the organic solvent system.

If the organic phase is still incompatible after the azeotrope, the block copolymer is then made compatible by refluxing with silicon-bonded hydroxyl condensation catalyst. These condensation catalysts are well known in the art as found in the copending United States application of Metevia and Polmanteer, Serial No. 210,235, field July 16, 1962, now abandoned, which is hereby incorporated by reference.

The preferred silicon-bonded hydroxyl condensation catalysts are phenoxides and phenoxide derivatives, and sulfonic acids and sulfonic acid derivatives.

The phenoxide derivatives are fully described in the copending United States application of Hyde and Schultz, Serial No. 191,738, filed May 2, 1962, which is hereby incorporated by reference. These compounds can be represented by the general formula

wherein $R'''$ is selected from the group consisting of monovalent hydrocarbon radicals, monovalent halohydrocarbon radicals, halogen atoms and monovalent hydrocarbonoxy radicals and each $R'''$ group contains up to 10 carbon atoms, and M is selected from the group consisting of the alkali metals, tetraorganophosphorus radicals, the organic radicals of the organo-nitrogen and organophosphorus radicals being selected from the group consisting of monovalent alkyl and aryl radicals attached directly to the nitrogen and phosphorus atoms, $m$ is an integer from 0 to 3 inclusive, $z$ is an integer from 1 to 3 inclusive and $m+n$ is an integer from 1 to 4 inclusive.

The $R'''$ group can be any halogen atom such as fluorine, chlorine, bromine and iodine and can be any monovalent hydrocarbon radical containing up to 10 carbon atoms such as alkyl radicals such as methyl, ethyl, isobutyl, tertiary amyl and decyl; unsaturated aliphatic radicals such as vinyl, allyl, propynyl and butadienyl; cycloaliphatic radicals such as cyclohexyl, cyclobutyl and cyclopentenyl; aralkyl radicals such as benzyl and beta-phenylethyl; and aromatic radicals such as phenyl, tolyl and xylyl; radical R can also be any halogenated monovalent hydrocarbon radical such as chloromethyl, bromovinyl, trifluoroethyl, tetrachlorophenyl and iodotolyl; radical R can also be any monovalent hydrocarbonoxy radical such as methoxy, isobutoxy, allyloxy and phenoxy.

The condensation catalyst can contain 0, 1, 2 or 3 of the R groups. When two or more R groups are present on the aromatic ring they can be the same or different. An advantage to be derived from the presence of substituent groups in certain cases is to promote greater solubility of the catalyst in the organosilicon composition to be polymerized. For example, the potassium salt of tertiarybutylphenol is quite soluble in hydroxylated dimethylpolysiloxane fluids. This increased solubility renders the catalyst more efficient than, for example, the somewhat less soluble potassium salt of phenol. Each system of the hydroxylated organopolysiloxanes would have one phenoxide which would be the most efficient although all will function in this invention.

The substituent M of the above condensation catalyst can be any alkali metal. This includes lithium, sodium, potassium, rubidium and cesium. Substituent M can also be a tetraorganonitrogen or tetraorganophosphorus radical, the organic radicals thereof being any monovalent alkyl or aryl radical, such as methyl, ethyl, isobutyl, phenyl, benzyl and naphthyl.

Specific examples of catalysts operable in this invention include potassium phenoxide, sodium-para-methyl-phenoxide,

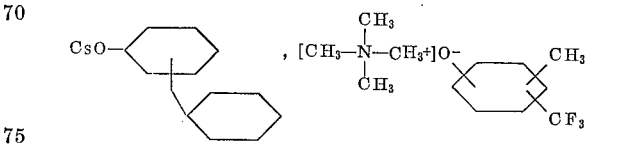

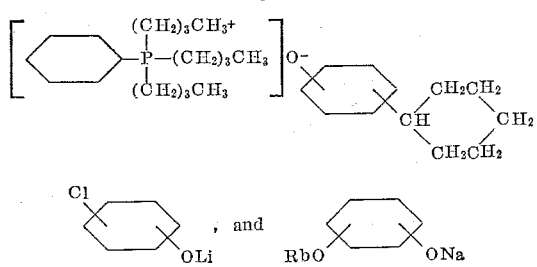
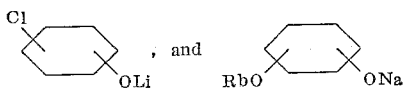

The sulfonic acids are also preferred catalysts in this invention, such sulfonic acids which are operable are described in the application Serial No. 210,235, supra. The aromatic sulfonic acids such as benzene sulfonic acid, para-toluene sulfonic acid, meta-toluene sulfonic acid, ortho-toluene sulfonic acid, and alpha-naphthylene sulfonic acid, are particularly useful in this invention. Sulfonic acid catalysts of the general formula $GSO_3H$ in which each G is either a perfluoroalkyl radical of less than 13 carbon atoms, $H(CF_2)_c$ or $F(CF_2)_c CFHCF_2$— where $c$ has a value of less than 3 are operative. Examples of these catalysts are $CF_3SO_3H$, $C_2F_5SO_3H$, $C_4H_9SO_3H$, $C_8F_{17}SO_3H$, $HCF_2CF_2SO_3H$, $CF_2HSO_3H$ and $$CF_3CFHCF_2SO_3H$$

Sulfoalkanoic acids such as described in U.S. Patent No. 3,078,255, issued February 19, 1963 are also operative. Illustrative of the sulfoalkanoic acids employed are gamma-sulfobutyric acid, gamma-sulfopentanoic acid, delta-sulfohexanoic acid, alphasulfopalmitic acid and alpha-sulfostearic acid.

Other silicon-bonded hydroxyl condensation catalysts which are operative in this invention are the alkali metal hydroxides such as KOH, LiOH, NaOH, CsOH and RbOH. Also operative are the organosilicon salts of alkali metal hydroxides. Suitable examples of such salts are $(CH_3)_3SiOK$, $(C_6H_5)(CH_3)_2SiOLi$,

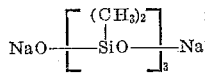

$(CH_3CH_2)_3SiONa$ and $(C_6H_5)_3SiOK$.

A further type of silicon-bonded hydroxyl condensation catalyst is found in the oxides of barium, strontium and calcium. Acids such as hydrochloric and sulfuric acids are also operative.

Another type of silicon-bonded hydroxyl condensation catalysts are the quaternary ammonium hydroxides and the organosilicon salts of such hydroxides. The organosilicon salts of quaternary ammonium hydroxides can be represented by the general formula

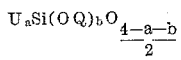

wherein U is an alkali stable organic radical such as monovalent hydrocarbon radicals or fluorinated monovalent hydrocarbon radicals and Q is a quaternary ammonium ion, $a$ has an average value of from 1 to 3 inclusive and $b$ has an average value of from 0.1 to 3 inclusive. Specific examples of such catalysts are beta-hydroxyethyltrimethyl ammonium hydroxide, benzyltrimethyl ammonium hydroxide, didodecyldimethyl ammonium hydroxide, $(CH_3)_3SiON(CH_3)_4$,

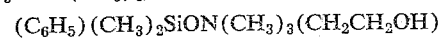

the benzyltrimethyl ammonium salt of dimethylsilane diol, octadecyltrimethyl ammonium hydroxide, tetradodecyl ammonium hydroxide, tritetradecylmethyl ammonium hydroxide, and hexadecyloctadecyldimethyl ammonium hydroxide.

Primary, secondary and tertiary amine can be used as catalysts in this invention. It is preferred that these amines have a dissociation constant of at least $10^{-10}$. Specific examples of amines operable in this invention can be found in the copending U.S. application Serial No. 210,235, identified above. Other classes of silicon-bonded hydroxyl condensation catalysts operative in this invention are the condensation products of an aliphatic aldehyde and an aliphatic primary amine, the alkali metal alkylene glycol monoborates, the organic isocyanates which are free of active hydrogen and which have only one isocyanate group per molecule as described in detail in U.S. Patent 3,032,530 (Falk), amine salts as described in the copending U.S. application of Hyde, Serial No. 826,421, filed July 13, 1959, now U.S. Patent No. 3,160,601, issued Dec. 8, 1964, entitled "Silanol Condensation Catalyst" which is hereby incorporated by reference, the p-aminobutyric acids of the general formula

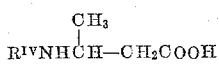

lactams of such as of the general formula

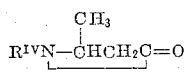

and alpha-amino acids of the general formula

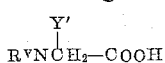

wherein $R^{IV}$ is a monovalent aliphatic hydrocarbon radical of from 5 to 30 inclusive carbon atoms, $R^V$ is an aliphatic hydrocarbon acyl group of from 5 to 30 inclusive carbon atoms and $Y'$ is either methyl or hydrogen and specific examples can be found in Fianu U.S. Patent No. 2,902,468 entitled "Method of Polymerizing Hydroxylated Siloxanes" which is hereby incorporated by reference, the carboxylic acid salts and the organic titanate compounds as described in copending U.S. application of Vincent, Serial No. 268,545, filed March 28, 1963, now abandoned, which is hereby incorporated by reference. The above list is operative in this invention and no claim is made to their particular efficiency as each system will differ from every other system in the efficiency of a specific catalyst. The silicon-bonded hydroxyl condensation catalyst described above are presented to show those skilled in the art some specific and most effective condensation catalyst. Any silicon-bonded hydroxyl condensation catalyst is operative in this invention.

The amount of catalyst required to affect the reaction is dependent upon a variety of factors, such as temperature and time of reaction, type of catalyst and reactants used. Thus, no meaningful numerical limits can be set for the catalyst concentration. However, the optimum concentration for any particular system can be easily determined by refluxing the incompatible solution and observing the time required for a compatible product to result. In general, the silicon-bonded hydroxyl condensation catalysts are used in the same concentrations applicable to their use in effecting siloxane condensations, in general. The most convenient concentration of catalyst to use is from 0.01 to 10 percent by weight of total solution.

The most successful silicon-bonded hydroxyl condensation catalysts are potassium phenoxide and para-toluene sulfonic acid.

When the organopolysiloxane solution is incompatible, the procedure to produce a compatible product (E) is accomplished by refluxing the solution for a period of time with a silicon-bonded hydroxyl condensation catalyst and then neutralizing. The temperature of reflux will vary accordingly with the solvent used, the solids concentration of the solution and the atmospheric or applied pressure of the system. The length of time required to obtain a compatible product will vary depending upon the reflux temperature, the strength of the catalyst and the properties of the final product desired. The reflux time will vary from five minutes to several hours (5 to 10) with the most efficient length of time from 10 to 90 minutes. The neutralization of the above product can be carried out by any conventional means, but the most desirable is with carbon dioxide. Others which can be used are weak acids such as acetic acid and weak bases and the like.

The composition can be concentrated by any conventional means for driving off the solvent. Such means are by vacuum with applied heat. Suitable curing agents can then be added to produce either a resinous or a rubber product.

Suitable curing catalysts useful in this invention are those which accelerate the condensation of residual silicon-bonded hydroxyl groups. Such curing catalysts are tertiary amines such as tributylamine as described in the copending U.S. application of Vincent, Serial No. 268,545, filed March 28, 1963, which is hereby incorporated by reference. Other curing catalysts described by Vincent and operative are organosiloxane-soluble metal carboxylates such as iron octoate and cobalt naphthenate, and other salts such as tetra-methylguanidine octoate. Curing is either accomplished by allowing the catalyzed system to set at ambient conditions or heating slightly whichever method is more convenient.

Additional materials can also be mixed with the composition of this invention, if desired. Preferably these are heat-stable materials, and include organic materials such as phthalocyanine; metal oxides such as antimony oxide, titania, alumina, ferric oxide or zirconia; siliceous materials such as amorphous or crystalline forms of silica, such as diatomaceous earth, fume silica, crushed quartz, silica xerogels- or sand; silicates such as aluminum silicate, magnesium silicate, zirconium silicate, magnesium aluminum silicate and calcium aluminum silicate; carbonaceous fillers such as graphite and carbon black; and powdered metals such as aluminum, iron, copper and zinc.

Further, other additives, such as oxidation inhibitors, coloring agents and other additives normally employed in organosilicon resins and rubbers can also be present.

This invention also relates to a new organopolysiloxane block copolymer consisting of (4) from 5 to 99 mole percent of blocks of the formula

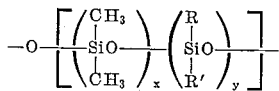

wherein each R and each R' is selected from the group consisting of methyl, ethyl, phenyl and vinyl radicals, $x$ is an integer of from 5 to 195 inclusive, $y$ is an integer of from 0 to 40 inclusive, there being no more than 10 mole percent organosiloxane units other than methyl containing siloxane units, there being of from 1.9 to 2.0 organo groups per silicon atom in the polymer block, there being at least two silicon-bonded oxygen atoms each having an unsatisfied valence bond attached to (5) a coupling unit bonded to the diorganopolysiloxane block (4) through the silicon-bonded oxygen atoms which has the general formula

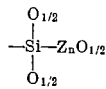

wherein Z is selected from the group consisting of

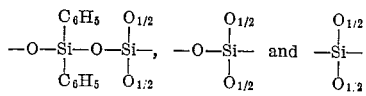

wherein $n$ is 0 or 1, said coupling units joining the diorgano-polysiloxane block (4) to (6) from 1 to 95 mole percent of silicon-containing blocks of the general unit formula $R''SiO_{3/2}$ wherein $R''$ is selected from the group consisting of aryl, alkaryl and halogenoaryl radicals through the silicon-bonded oxygen atoms of the coupling agent designated as $-O_{1/2}$.

The organopolysiloxane block copolymer described above is made by the method of this invention. The diorganopolysiloxane block is coupled to a mono-organopolysiloxane block through a coupling agent.

The R, R', $x$ and $y$ have been fully described above in the description of the procedure for making the block copolymer. The diorganopolysiloxane block originally contained at least two hydroxyl groups per molecule. This same block in the position of the hydroxyl groups has silicon-bonded oxygen atoms which are attached to a silicon atom of the coupling agent. The critical feature of the coupling agent is that it is polyfunctional and that the linking or coupling silicon atom which attaches directly to the diorganopolysiloxane block through a silicon-oxygen-silicon linkage has no organo groups attached through Si—C bonds.

The coupling agent linking the diorganopolysiloxane to the mono-organopolysiloxane is a polyfunctional group. Each coupling agent has at least four Si—$O_{1/2}$ bonds which are used for linking or coupling the above to siloxane blocks. The designation —$O_{1/2}$ shows that the bonds from the coupling agent to either the diorganopolysiloxane block or the mono-organopolysiloxane block are oxygen linkages such as

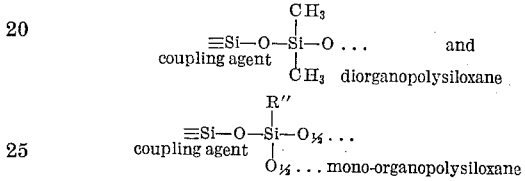

The R'' in the mono-organopolysiloxane has been fully described above.

When $x+y$ in the diorganopolysiloxane ranges from 5 to 95 a resinous product is formed. This product ranges from hard, tough and slightly flexible materials to tough and flexible materials. These block copolymers have unusually good mechanical shock resistance, thermal shock resistance and retention of strength at elevated temperatures. In addition, they have an extremely low percentage of volatile fragments. The resinous type block copolymers are useful in coating, encapsulating, laminating and molding applications.

When $x+y$ in the diorganopolysiloxane is from 110 to 195, the product is a rubbery material. The rubber stocks of this invention can be used to produce elastomers having high tensile strengths without the addition of filler, excellent elasticity and very high fatigue resistance. The elastomers of this invention can be used in places where conventional silicone elastomers are used.

When $x+y$ is from 110 to 195 the block copolymer is exceptionally useful for blending with rubbery siloxanes to give added strength or with brittle resinous siloxanes to give added flexibility.

The following examples are illustrative only and should not be construed as limiting the invention which is properly delineated in the appended claims. Unless otherwise stated, all viscosities were determined at 25° C.

*Example 1.*—322 g. of toluene are mixed with 118 g. (40 mole percent) of a hydroxyl containing dimethylpolysiloxane of an average of 24 silicon atoms with a viscosity of 50 cs. The above dimethylpolysiloxane solution was added to a solution containing 322 g. of toluene (dry), 22 g. of pyridine and 23.2 g. of SiCl$_4$ and agitated for 30 minutes, 508 g. (60 mole percent) of phenyltrichlorosilane was added to the coupled dimethylpolysiloxane—SiCl$_4$ solution. The total mixture is then poured into 2367 g. of water and heated to 75° C. The resulting solution is separated from the aqueous phase and then washed with water. The resulting organic phase is azeotroped dry. 0.1 weight percent of potassium phenoxide based on the weight of the siloxane is added and the solution is refluxed for 15 minutes. The catalyst is neutralized with solid carbon dioxide and the solution is filtered and is one phase. The final solution is 52.6 weight percent solids with a viscosity of 68 cps. at 25° C. and after the solvent is removed the block copolymer loses only 1.6 weight percent when heated for 3 hours at 250° C. The copolymer is cured by adding 0.1 weight percent tetramethylguanidine octoate. A laminate made from the block copolymer had a room temperature flex of 19,700 p.s.i., a 500° F. flex of 7,700 p.s.i., and an edge compression at room temperature of 6,800 p.s.i. The edge compression is measured by applying a force to the edge of a laminated section.

*Example 2.*—The method run according to Example 1, except a 30 mole percent of the dimethylpolysiloxane of Example 1 and 70 mole percent phenyltrichlorosilane was used. This product was compatible before refluxing with potassium phenoxide and had a final solids content of 40.5 percent with a viscosity of 75 cps. at 25° C. The 100 percent solids block copolymer had only 1.4 weight percent loss after 3 hours at 250° C. A laminate made with this product had a room temperature flex of 22,100 p.s.i., a 500° F. flex of 7,500 p.s.i. and an edge compression at room temperature of 7,400 p.s.i.

*Example 3.*—A block copolymer was prepared according to Example 1 with 10 mole percent of the dimethylpolysiloxane of Example 1 and 90 mole percent of phenyltrichlorosilane. The product is compatible after refluxing with potassium phenoxide. The solids content of the solution is 44.4 weight percent with a viscosity of 47 cps. at 25° C. and the weight loss after 3 hours at 250° C. is 0.30 weight percent for the 100 percent solids block copolymer.

*Example 4.*—To a solution of 22 g. of $SiCl_4$, 16 g. of pyridine and 206 g. of pure toluene is slowly added a solution of 111 g. (50 mole percent) of the dimethylpolysiloxane of Example 1 and 111 g. of toluene. The mixture is stirred for 30 minutes. To the above mixture, a solution of 190 g. (50 mole percent) of monophenylpolysiloxane is added and agitated for 15 minutes with 20 g. of pyridine. The mixture is washed and azeotroped dry. A compatible material of 30.5 percent solids with a viscosity of 19 cps. at 25° C. is the product.

*Example 5.*—A compatible block copolymer is obtained by the method of Example 1 except that a dimethylpolysiloxane is used which has an average chain length of 34 silicon atoms instead of 24 silicon atoms. After the hydrolysis step and separation of the aqueous and organic phases, the organic phase is washed with a solution of $NaHCO_3$ and NaCl and then azeotroped dry. The solids content of the final solution is 51.2 percent with a viscosity of 48 cps. at 25° C. and the 100 percent solids copolymer has a weight loss of 1.4 percent after 3 hours at 250° C. A laminate made from the block copolymer has a room temperature flex of 19,188 p.s.i., a 500° F. flex of 4,237 and an edge compression at room temperature of 8,567 p.s.i.

*Example 6.*—74 g. (50 mole percent) of a 70 cs. hydroxylated dimethylpolysiloxane of an average chain length of 34 silicon atoms was mixed with 258 g. of toluene and then added to a solution of 10 g. of $SiCl_4$, 9 g. of pyridine and 258 g. of toluene. The mixture was agitated for 20 minutes and 211 g. (50 mole percent) of phenyltrichlorosilane was added. The above mixture was added to 972 g. of water to make a 10 weight percent HCl solution and agitated. The temperature reached 60° C. The two phases were separated and washed with water. The organic phase was azeotroped dry and filtered. The final solution was 30.2 percent solids with a viscosity of 4.3 cp. at 25° C. The weight loss of a film after three hours at 250° C. was 1.8 percent. The product yielded clear, tough and flexible films when cured with 0.1 weight percent tetramethylguanidine octoate, but was hard and brittle uncured.

*Example 7.*—A solution of 111 g. (75 mole percent) of a 231 cs. hydroxylated dimethylpolysiloxane of an average chain length of 108 silicon atoms and 100 g. of dry toluene was added to a solution of 5 g. of $SiCl_4$, 4 g. of pyridine and 164 g. of dry toluene. The mixture was agitated for 30 minutes. 106 g. (25 mole percent) of phenyltrichlorosilane was added to the above mixture and then hydrolyzed with 486 g. of water enough to produce a 10 percent HCl solution. The temperature of the hydrolysis reached 72° C. The organic phase was decanted from the aqueous acid phase and washed until no acid remained. The organic phase was azeotroped dry. At this point the film from the solution was incompatible, therefore 0.1 weight percent of para-toluene sulfonic acid was added and refluxed for 15 minutes. The solution was neutralized with $NaHCO_3$ and filtered. The product produces clear compatible films and when cured with tetramethylguanidine octoate the material was tough and rubbery. The final solution was 37.1 percent solids with a viscosity of 45 cp. The weight loss from a film of the block copolymer was 0.12 percent after 3 hours at 250° C.

*Example 8.*—The same procedure as Example 7 is used with the following exceptions. The dimethylpolysiloxane of Example 7 was 60 mole percent and the phenyltrichlorosilane was 40 mole percent. The $SiCl_4$ and the dimethylpolysiloxane were allowed to react for 60 minutes instead of 30 minutes and the temperature of the hydrolysis reached 75° C. To produce a compatible product 0.10 weight percent potassium phenoxide was used and refluxed for 30 minutes. The neutralization was accomplished with acetic acid. The final block copolymer had a 29.5 percent solids content and a viscosity of 22 cp. at 25° C. The weight loss of a film after 3 hours at 250° C. was 0.65 percent.

*Example 9.*—A similar product as in Example 8 is obtained from a 50 mole percent dimethylpolysiloxane of Example 7 and 50 mole percent phenyltrichlorosilane; using the procedure of Example 7.

The incompatible solution is made compatible by refluxing for 60 minutes with potassium phenoxide and neutralizing with solid carbon dioxide.

*Example 10.*—A solution of 111 g. (75 mole percent) of a 1670 cs. hydroxylated dimethylpolysiloxane of an average chain length of 270 silicon atoms and 100 g. of purified toluene was added to a solution of 4 g. of $SiCl_4$, 3 g. of pyridine and 164 g. of purified toluene. The above mixture was agitated for 60 minutes and then 106 g. (25 mole percent) of phenyltrichlorosilane was added. This mixture was hydrolyzed with 486 g. of water making a 10 weight percent HCl solution. The organic phase was decanted from the acid aqueous phase and neutralized. The organic phase was azeotroped dry and then 0.1 weight percent potassium phenoxide was added and refluxed for 105 minutes, followed by neutralization with solid carbon dioxide. The filtered block copolymer gave a tough rubber film.

*Example 11.*—The process of Example 9 was used in producing a 75 mole percent dimethylpolysiloxane with an average chain length of 170 silicon atoms and 25 mole percent phenyltrichlorosilane block copolymer. The final solution was 22.4 percent solids with a viscosity of 68 cp. at 25° C. The weight loss of the film was 8.8 percent after 3 hours at 250° C. The film is tough and rubbery. The block copolymer prepared from this procedure gave a rubber which has a Durometer hardness of 31, tensile strength of 1075 p.s.i. and an elongation of 410 percent.

*Example 12.*—To a solution of 1.7 g. of $SiCl_4$, 2 g. of pyridine, and 132 g. of purified toluene, 111 g. (75 mole percent) of 2400 cs. hydroxylated dimethylpolysiloxane with an average chain length of 325 was slowly added over a period of 25 minutes. This mixture was agitated for 30 minutes after the addition. To this mixture 106 g. (25 mole percent) of phenyltrichlorosilane was added and then hydrolyzed with 486 g. of water enough to make a 10 weight percent solution of HCl. The temperature varied from 50 to 71° C. The addition time was two minutes and the agitation time was 10 minutes. The two phase were separated by decantation and the organic phase was washed with $NaHCO_3$ and water, neutralizing the acid. The organic phase was azeotroped dry and 0.1 weight percent potassium phenoxide was added and refluxed for seven minutes. The solution was neutralized with solid carbon dioxide and filtered. The final solution was 28.2 percent solids with a viscosity of 210 cp. at 25° C. The cured block copolymer is tough and rubbery.

*Example 13.*—Example 12 is repeated using perchloroethylene instead of toluene. After the reflux with the potassium phenoxide, acetic acid was used to neutralize the solution. The final solution was 12.7 percent solids with a viscosity of 28 cp. and had a film weight loss of 1.0 percent after 3 hours at 250° C. The block copolymer when cured with tetramethylguanidine octoate produces a rubbery material with good adhesion to aluminum.

*Example 14.*—A block copolymer made by the method of Example 12, except that the dimethylpolysiloxane had an average chain length of 216 silicon atoms and no pyridine was used as an acid acceptor. The final solution was 27.2 percent solids with a viscosity of 116 cp. at 25° C. The film was tough and rubbery.

*Example 15.*—A solution of 104 g. (70 mole percent) of 1670 cs. hydroxylated dimethylpolysiloxane with an average chain length of 270 silicon atoms and 137 g. of toluene was slowly added to a solution of 1.7 g. of SiCl$_4$ and 137 g. of toluene. The mixture was stirred for 30 minutes after the addition was complete. 106 g. (25 mole percent) of phenyltrichlorosilane and 19.1 g. (5 mole percent) of phenylmethyldichlorosilane is added to the above solution and then hydrolyzed with 551 g. of water enough to make 10 percent HCl solution. The hydrolysis temperature reaches 75° C. and is stirred for 10 minutes. After the organic phase is separated from the aqueous phase by decantation, the organic phase is washed and neutralized with NaHCO$_3$ and water. The organic phase is azeotroped dry and then refluxed with 0.1 weight percent of para-toluene sulfonic acid for 2.5 hours to produce the block copolymers.

*Example 16.*—A block copolymer is made according to the procedure of Example 10, except that instead of the 4 g. of SiCl$_4$ added to the dimethylpolysiloxane as a coupling agent, 36.4 g. of

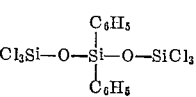

is added. The

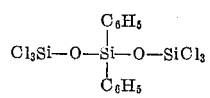

is prepared as follows: 21.6 g. (1 mole) of $$(C_6H_5)_2Si(OH)_2$$

dispersed in 200 g. of purified toluene is slowly added to 33.6 g. (2 moles) of SiCl$_4$ in 100 g. of purified toluene and agitated for 1.5 hours. The final product is rubbery when cured with 0.1 weight percent tetramethylguanidine octoate.

*Example 17.*—111 g. (75 mole percent) of the dimethylpolysiloxane of Example 12 in 83 g. of purified toluene is added very slowly to 1.7 g. of SiCl$_4$ in 83 g. of purified toluene and 2 g. of pyridine. Additional toluene is added to make agitation easy. The total agitation time is 2.5 hours. A solution of 162 g. (25 mole percent) of monophenylpolysiloxane in toluene is added to the above solution and agitated for 60 minutes. The one phase system is filtered and a small amount of pyridine is added and the solution is heated for 30 minutes. A small amount of HCl in water is added and agitated, then immediately washed and neutralized. The solution is then azeotroped dry and filtered. The final solution is 17.1 percent solids with a viscosity of 19 cp. at 25° C. The rubbery film has a weight loss of 2.7 percent after 3 hours at 250° C.

*Example 18.*—A block copolymer is prepared according to Example 11. When 90 mole percent hydroxylated dimethylpolysiloxane with an average chain length of 170 silicon atoms and 10 mol percent phenyltrichlorosilane replaces the mole percentages. A tough rubbery material is obtained when the final solution is refluxed for three hours in the presence of 0.5 weight percent of $$CF_3CF_2SO_3H$$

*Example 19.*—When the following hydroxylated diorganopolysiloxanes are used in accordance with the procedure of Example 1 resinous coating can be obtained with similar properites. Table I shows the conditions and reactants:

TABLE I

| | I Diorganopolysiloxane | II Mole percent | III Coupling compound | IV Mono-organo-trihalosilane | V Mole percent | VI Percent solids | VII Solvent |
|---|---|---|---|---|---|---|---|
| 1 | HO—[SiO(CH$_3$)$_2$]$_7$—H | 50 | SiBr$_4$ | ⬡—SiCl$_3$ | 50 | 40 | Aromatic naphtha. |
| 2 | HO—[SiO(CH$_3$)$_2$]$_{16}$—H | 40 | Cl$_3$SiOSiCl$_3$ | CH$_3$—⬡—SiBr$_3$ | 60 | 40 | Diethyl ether. |
| 3 | HO—[SiO(CH$_3$)$_2$]$_{25}$[SiO(C$_6$H$_5$)(CH$_3$)]$_3$—OH | 60 | Cl$_3$SiOSi(C$_6$H$_5$)$_2$OSiCl$_3$ | ⬡⬡—SiCl$_3$ | 40 | 40 | Toluene. |
| 4 | HO—[SiO(CH$_3$)$_2$]$_{45}$—H | 70 | SiCl$_4$ | Cl—⬡—SiCl$_3$ | 30 | 40 | Perchloroethylene. |
| 5 | HO—[SiO(CH$_3$)$_2$]$_{60}$[SiO(CH=CH$_2$)(CH$_3$)]$_{10}$—H | 30 | SiCl$_3$Br | CH$_3$—⬡(CH$_3$)—SiCl$_3$ | 70 | 40 | Toluene. |

TABLE I.—Continued

| | VIII Silicon-bonded hydroxyl condensation catalyst | IX Percent by wt. | X Percent hydrogen halide for hydrolysis | XI Hydrolysis temperature maximum | XII Curing catalyst | XIII Percent curing catalyst |
|---|---|---|---|---|---|---|
| 1 | $CH_3-\underset{\underset{CH_3}{|}}{\overset{\overset{CH_3}{|}}{C}}-\underset{}{\bigcirc}-OK$ | 1.5 | 0.5 | 156 | Cesium naphthenate | 0.6 |
| 2 | $CH_3-\underset{\underset{CH_3}{|}}{\overset{\overset{C_6H_5}{|}}{Si}}-O-Li$ | 0.4 | 17 | 29 | Copper naphthenate | 0.1 |
| 3 | $\left[C_6H_5-\underset{\underset{CH_3}{|}}{\overset{\overset{CH_3}{|}}{N}}-CH_3\right]^+[OH]^-$ | 3.6 | 9 | 87 | Ferric octoate | 0.3 |
| 4 | $CH_3CH_2CH_2-\underset{\underset{CH_2CH_2CH_3}{|}}{\overset{\overset{CH_2CH_2CH_3}{|}}{N}}$ | 0.9 | 20 | 30 | Zinc naphthenate | 1.2 |
| 5 | $Cl_3CCOOH$ | 0.08 | 10 | 70 | Tetramethylguanidine octoate | 0.5 |

That which is claimed is:
1. A method of producing a silicon-containing block copolymer consisting essentially of
   (A) reacting an inert organic solvent solution of
   (1) an organopolysiloxane of the general formula $$HO-\left[\left(\underset{\underset{CH_3}{|}}{\overset{\overset{CH_3}{|}}{Si}}O\right)_x\left(\underset{\underset{R'}{|}}{\overset{\overset{R}{|}}{Si}}O\right)_y\right]-H$$

wherein each R and each R' is a monovalent radical selected from the group consisting of methyl, ethyl, phenyl and vinyl radicals, $x$ is an integer from 5 to 400 inclusive, $y$ is an integer from 0 to 40 inclusive, there being no more than 10 mol percent organosiloxane groups other than dimethylsiloxane units in the polymer, there being an average of from 1.9 to 2.0 organic groups per silicon atom, with
   (2) a silicon-containing compound of the general formula Y—SiX₃ wherein Y is a monovalent radical selected from the group consisting of a halogen atom, —OSiCl₃, —OSiBr₃, $$-O\underset{\underset{C_6H_5}{|}}{\overset{\overset{C_6H_5}{|}}{Si}}-OSiCl_3$$

and —SiCl₃ and X is a halogen atom,
said silicon-containing compound (2) being present in an amount of at least one molecule per hydroxyl group present in (1),
   (B) thereafter mixing the reaction product formed in (A) with
      (3) a silicon-containing compound selected from the group consisting of
         (a) silanes of the general formula R″SiX₃ wherein R″ is a monovalent radical selected from the group consisting of aryl, alkaryl and halogenaryl and X is a halogen atom,
         (b) hydrolysis products of (a), and
         (c) mixtures thereof,
the amount of (3) being from 1 to 95 mol percent based on the combined amount of (1) and (3), and
   (C) hydrolyzing the mixture of the reaction product formed in (A) and the silicon-containing compound (3) to form an organopolysiloxane block copolymer.

2. A method of producing a silicon-containing block copolymer consisting essentially of
   (A) reacting an inert organic solvent solution of
   (1) an organopolysiloxane of the general formula $$HO-\left[\left(\underset{\underset{CH_3}{|}}{\overset{\overset{CH_3}{|}}{Si}}O\right)_x\left(\underset{\underset{R'}{|}}{\overset{\overset{R}{|}}{Si}}O\right)_y\right]-H$$

wherein each R and each R' is a monovalent hydrocarbon radical selected from the group consisting of methyl, ethyl, phenyl, and vinyl radicals, $x$ is an integer from 5 to 400 inclusive, $y$ is an integer from 0 to 40 inclusive, there being no more than 10 mol percent organosiloxane groups other than dimethylsiloxane units in the polymer, the organopolysiloxane containing an average of from 1.98 to 2.0 organic groups per silicon atom, with
   (2) a silicon-containing compound of the general formula Y—SiX₃ wherein Y is a monovalent radical selected from the group consisting of a halogen atom, —OSiCl₃, —OSiBr₃, $$-O\underset{\underset{C_6H_5}{|}}{\overset{\overset{C_6H_5}{|}}{Si}}-O-SiCl_3$$

and —SiCl₃ and X is a halogen atom,
said silicon-containing compound (2) being present in an amount of at least one molecule per hydroxyl group present in (1) and in the presence of an acid acceptor,
   (B) mixing the reaction product formed in (A) with
      (3) a silicon-containing compound selected from the group consisting of
         (a) silanes of the general formula R″SiX₃ wherein R″ is a monovalent radical selected from the group consisting of aryl, alkaryl and halogenoaryl and X is a halogen atom,
         (b) hydrolysis products of (a) and
         (c) mixtures thereof,
the amount of (3) being from 1 to 95 mol percent based on the combined amount of (1) and (3),
   (C) hydrolyzing the mixture of the reaction product formed in (A) and the silicon-containing compound (3) at a temperature of from 25° to 175° C. in water containing from 0.01 to 30% by weight hydrogen halide and forming two phases, an organopolysiloxane-organic phase and an aqueous phase,

*Example 13.*—Example 12 is repeated using perchloroethylene instead of toluene. After the reflux with the potassium phenoxide, acetic acid was used to neutralize the solution. The final solution was 12.7 percent solids with a viscosity of 28 cp. and had a film weight loss of 1.0 percent after 3 hours at 250° C. The block copolymer when cured with tetramethylguanidine octoate produces a rubbery material with good adhesion to aluminum.

*Example 14.*—A block copolymer made by the method of Example 12, except that the dimethylpolysiloxane had an average chain length of 216 silicon atoms and no pyridine was used as an acid acceptor. The final solution was 27.2 percent solids with a viscosity of 116 cp. at 25° C. The film was tough and rubbery.

*Example 15.*—A solution of 104 g. (70 mole percent) of 1670 cs. hydroxylated dimethylpolysiloxane with an average chain length of 270 silicon atoms and 137 g. of toluene was slowly added to a solution of 1.7 g. of $SiCl_4$ and 137 g. of toluene. The mixture was stirred for 30 minutes after the addition was complete. 106 g. (25 mole percent) of phenyltrichlorosilane and 19.1 g. (5 mole percent) of phenylmethyldichlorosilane is added to the above solution and then hydrolyzed with 551 g. of water enough to make 10 percent HCl solution. The hydrolysis temperature reaches 75° C. and is stirred for 10 minutes. After the organic phase is separated from the aqueous phase by decantation, the organic phase is washed and neutralized with $NaHCO_3$ and water. The organic phase is azeotroped dry and then refluxed with 0.1 weight percent of para-toluene sulfonic acid for 2.5 hours to produce the block copolymers.

*Example 16.*—A block copolymer is made according to the procedure of Example 10, except that instead of the 4 g. of $SiCl_4$ added to the dimethylpolysiloxane as a coupling agent, 36.4 g. of

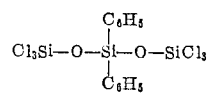

is added. The

is prepared as follows: 21.6 g. (1 mole) of $$(C_6H_5)_2Si(OH)_2$$

dispersed in 200 g. of purified toluene is slowly added to 33.6 g. (2 moles) of $SiCl_4$ in 100 g. of purified toluene and agitated for 1.5 hours. The final product is rubbery when cured with 0.1 weight percent tetramethylguanidine octoate.

*Example 17.*—111 g. (75 mole percent) of the dimethylpolysiloxane of Example 12 in 83 g. of purified toluene is added very slowly to 1.7 g. of $SiCl_4$ in 83 g. of purified toluene and 2 g. of pyridine. Additional toluene is added to make agitation easy. The total agitation time is 2.5 hours. A solution of 162 g. (25 mole percent) of monophenylpolysiloxane in toluene is added to the above solution and agitated for 60 minutes. The one phase system is filtered and a small amount of pyridine is added and the solution is heated for 30 minutes. A small amount of HCl in water is added and agitated, then immediately washed and neutralized. The solution is then azeotroped dry and filtered. The final solution is 17.1 percent solids with a viscosity of 19 cp. at 25° C. The rubbery film has a weight loss of 2.7 percent after 3 hours at 250° C.

*Example 18.*—A block copolymer is prepared according to Example 11. When 90 mole percent hydroxylated dimethylpolysiloxane with an average chain length of 170 silicon atoms and 10 mol percent phenyltrichlorosilane replaces the mole percentages. A tough rubbery material is obtained when the final solution is refluxed for three hours in the presence of 0.5 weight percent of $$CF_3CF_2SO_3H$$

*Example 19.*—When the following hydroxylated diorganopolysiloxanes are used in accordance with the procedure of Example 1 resinous coating can be obtained with similar properites. Table I shows the conditions and reactants:

TABLE I

| | I Diorganopolysiloxane | II Mole percent | III Coupling compound | IV Mono-organo-trihalosilane | V Mole percent | VI Percent solids | VII Solvent |
|---|---|---|---|---|---|---|---|
| 1 | $HO\text{-}[SiO(CH_3)_2]_7\text{-}H$ | 50 | $SiBr_4$ | phenyl-$SiCl_3$ | 50 | 40 | Aromatic naphtha. |
| 2 | $HO\text{-}[SiO(CH_3)_2]_{15}\text{-}H$ | 40 | $Cl_3SiOSiCl_3$ | $CH_3$-phenyl-$SiBr_3$ | 60 | 40 | Diethyl ether. |
| 3 | $HO\text{-}[SiO(CH_3)_2]_{25}[SiO(C_6H_5)_2]_3\text{-}OH$ | 60 | $Cl_3SiOSi(C_6H_5)_2OSiCl_3$ | naphthyl-$SiCl_3$ | 40 | 40 | Toluene. |
| 4 | $HO\text{-}[SiO(CH_3)_2]_{15}\text{-}H$ | 70 | $SiCl_4$ | Cl-phenyl-$SiCl_3$ | 30 | 40 | Perchloroethylene. |
| 5 | $HO\text{-}[SiO(CH_3)_2]_{50}[SiO(CH=CH_2)(CH_3)]_{10}\text{-}H$ | 30 | $SiCl_3Br$ | (CH_3)_2-phenyl-$SiCl_3$ | 70 | 40 | Toluene. |

TABLE I.—Continued

| | VIII Silicon-bonded hydroxyl condensation catalyst | IX Percent by wt. | X Percent hydrogen halide for hydrolysis | XI Hydrolysis temperature maximum | XII Curing catalyst | XIII Percent curing catalyst |
|---|---|---|---|---|---|---|
| 1 | $CH_3-\underset{\underset{CH_3}{|}}{\overset{\overset{CH_3}{|}}{C}}-\langle\phantom{xx}\rangle-OK$ | 1.5 | 0.5 | 156 | Cesium naphthenate | 0.6 |
| 2 | $CH_3-\underset{\underset{CH_3}{|}}{\overset{\overset{C_6H_5}{|}}{Si}}-O-Li$ | 0.4 | 17 | 29 | Copper naphthenate | 0.1 |
| 3 | $\left[C_6H_5-\underset{\underset{CH_3}{|}}{\overset{\overset{CH_3}{|}}{N}}-CH_3\right]^+[OH]^-$ | 3.6 | 9 | 87 | Ferric octoate | 0.3 |
| 4 | $CH_3CH_2CH_2-\underset{\underset{CH_2CH_2CH_3}{|}}{\overset{\overset{CH_2CH_2CH_3}{|}}{N}}$ | 0.9 | 20 | 30 | Zinc naphthenate | 1.2 |
| 5 | $Cl_3CCOOH$ | 0.08 | 10 | 70 | Tetramethylguanidine octoate | 0.5 |

That which is claimed is:
1. A method of producing a silicon-containing block copolymer consisting essentially of
(A) reacting an inert organic solvent solution of
(1) an organopolysiloxane of the general formula $$HO-\left[\left(\underset{\underset{CH_3}{|}}{\overset{\overset{CH_3}{|}}{Si}}O\right)_x\left(\underset{\underset{R'}{|}}{\overset{\overset{R}{|}}{Si}}O\right)_y\right]-H$$

wherein each R and each R' is a monovalent radical selected from the group consisting of methyl, ethyl, phenyl and vinyl radicals, x is an integer from 5 to 400 inclusive, y is an integer from 0 to 40 inclusive, there being no more than 10 mol percent organosiloxane groups other than dimethylsiloxane units in the polymer, there being an average of from 1.9 to 2.0 organic groups per silicon atom, with
(2) a silicon-containing compound of the general formula Y—SiX₃ wherein Y is a monovalent radical selected from the group consisting of a halogen atom, —OSiCl₃, —OSiBr₃, $$-O\underset{\underset{C_6H_5}{|}}{\overset{\overset{C_6H_5}{|}}{Si}}-OSiCl_3$$

and —SiCl₃ and X is a halogen atom, said silicon-containing compound (2) being present in an amount of at least one molecule per hydroxyl group present in (1),
(B) thereafter mixing the reaction product formed in (A) with
(3) a silicon-containing compound selected from the group consisting of
(a) silanes of the general formula R″SiX₃ wherein R″ is a monovalent radical selected from the group consisting of aryl, alkaryl and halogenaryl and X is a halogen atom,
(b) hydrolysis products of (a), and
(c) mixtures thereof,
the amount of (3) being from 1 to 95 mol percent based on the combined amount of (1) and (3), and
(C) hydrolyzing the mixture of the reaction product formed in (A) and the silicon-containing compound (3) to form an organopolysiloxane block copolymer.
2. A method of producing a silicon-containing block copolymer consisting essentially of
(A) reacting an inert organic solvent solution of
(1) an organopolysiloxane of the general formula $$HO-\left[\left(\underset{\underset{CH_3}{|}}{\overset{\overset{CH_3}{|}}{Si}}O\right)_x\left(\underset{\underset{R'}{|}}{\overset{\overset{R}{|}}{Si}}O\right)_y\right]-H$$

wherein each R and each R' is a monovalent hydrocarbon radical selected from the group consisting of methyl, ethyl, phenyl, and vinyl radicals, x is an integer from 5 to 400 inclusive, y is an integer from 0 to 40 inclusive, there being no more than 10 mol percent organosiloxane groups other than dimethylsiloxane units in the polymer, the organopolysiloxane containing an average of from 1.98 to 2.0 organic groups per silicon atom, with
(2) a silicon-containing compound of the general formula Y—SiX₃ wherein Y is a monovalent radical selected from the group consisting of a halogen atom, —OSiCl₃, —OSiBr₃, $$-O\underset{\underset{C_6H_5}{|}}{\overset{\overset{C_6H_5}{|}}{Si}}-O-SiCl_3$$

and —SiCl₃ and X is a halogen atom, said silicon-containing compound (2) being present in an amount of at least one molecule per hydroxyl group present in (1) and in the presence of an acid acceptor,
(B) mixing the reaction product formed in (A) with
(3) a silicon-containing compound selected from the group consisting of
(a) silanes of the general formula R″SiX₃ wherein R″ is a monovalent radical selected from the group consisting of aryl, alkaryl and halogenoaryl and X is a halogen atom,
(b) hydrolysis products of (a) and
(c) mixtures thereof,
the amount of (3) being from 1 to 95 mol percent based on the combined amount of (1) and (3),
(C) hydrolyzing the mixture of the reaction product formed in (A) and the silicon-containing compound (3) at a temperature of from 25° to 175° C. in water containing from 0.01 to 30% by weight hydrogen halide and forming two phases, an organopolysiloxane-organic phase and an aqueous phase, (D) separating the organopolysiloxane-organic phase from the aqueous phase, and
(E) adding a silicon-bonded hydroxyl condensation catalyst to the organopolysiloxane phase and refluxing the dried organopolysiloxane phase for a sufficient length of time to form an organopolysiloxane block copolymer.

3. A method of producing a silicon-containing block copolymer consisting essentially of
(A) reacting an inert organic solvent solution of
(1) an organopolysiloxane of the general formula

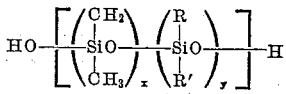

wherein each R and each R' is a monovalent hydrocarbon radical selected from the group consisting of methyl, ethyl, phenyl and vinyl radicals, $x$ is an integer from 5 to 400 inclusive, $y$ is an integer from 0 to 40 inclusive, there being no more than 10 mol percent organosiloxane groups other than dimethylsiloxane units in the polymer, the organopolysiloxane containing an average of from 1.98 to 2.0 organic groups per silicon atom and having a viscosity range of from 25 to 1,000,000 centipoises at 25° C.
(2) a silicon-containing compound of the general formula Y—SiX$_3$ wherein Y is a monovalent radical selected from the group consisting of a halogen atom, —OSiCl$_3$, —OSiBr$_3$,

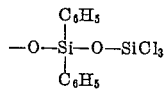

and —SiCl$_3$ and X is a halogen atom, said silicon-containing compound (2) being present in an amount of at least one molecule per hydroxyl group present in (1), and in the presence of an acid acceptor,
(B) mixing the reaction product formed in (A) with
(3) a silicon-containing compound selected from the group consisting of
(a) silanes of the general formula R"SiX$_3$ wherein R" is a monovalent radical selected from the group consisting of aryl, alkaryl and halogenoaryl and X is a halogen atom,
(b) hydrolysis products of (a), and
(c) mixtures thereof,
the amount of (3) being from 1 to 95 mol percent based on the combined amount of (1) and (3),
(C) hydrolyzing the mixture of the reaction product formed in (A) and the silicon-containing compound (3) at a temperature of from 25° to 175° C. in water containing from 0.01 to 30% by weight hydrogen halide and forming two phases, an organopolysiloxane-organic phase and an aqueous phase,
(D) separating the organopolysiloxane-organic phase from the aqueous phase, neutralizing the organopolysiloxane-organic phase and azeotroping the organopolysiloxane-organic phase dry,
(E) adding a silicon-bonded hydroxyl condensation catalyst to the dried organopolysiloxane phase, refluxing the dried organopolysiloxane phase for a sufficient length of time to form an organopolysiloxane block copolymer, and then neutralizing said block copolymer, the solvent employed in (A) above being sufficient to provide a solution containing from 5 to 60 percent by weight of the organopolysiloxane block copolymer.

4. A method of producing a silicon-containing block copolymer according to claim 3, wherein (3) is present in amount from 20 to 90 mol percent and $x+y$ is an integer from 5 to 95 inclusive.

5. A method of producing a silicon-containing block copolymer according to claim 3 wherein (3) is present in amount from 5 to 30 mol percent and $x+y$ is an integer from 110 to 400 inclusive.

6. A method of producing a silicon-containing block copolymer according to claim 3 wherein (3) is present in amount from 5 to 30 mol percent, $x+y$ is an integer from 110 to 195.

7. A method of producing a silicon-containing block copolymer consisting essentially of
(A) reacting an inert organic solvent solution of
(1) a dimethylpolysiloxane of the general formula

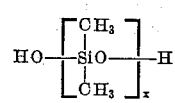

wherein $x$ is an integer from 5 to 400 inclusive, there being an average of from 1.98 to 2.0 organic groups per silicon atom, with
(2) SiCl$_4$
said SiCl$_4$ being present in an amount of at least one SiCl$_4$ molecule per hydroxyl group present in (1),
(B) mixing the reaction product formed in (A) with
(3) phenyltrichlorosilane, the amount of (3) being from 1 to 95 mol percent based on the combined amount of (1) and (3), and
(C) hydrolyzing the mixture of the reaction product formed in (A) and phenyltrichlorosilane, (3) to form an organopolysiloxane block copolymer.

8. An organopolysiloxane block copolymer consisting of
(4) organopolysiloxane blocks of the general formula

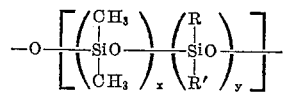

wherein each R and each R' is a monovalent hydrocarbon radical selected from the group consisting of methyl, ethyl, phenyl and vinyl radicals, $x$ is an integer of from 5 to 95 inclusive, $y$ is an integer of from 0 to 40 inclusive, there being no more than 10 mol percent organosiloxane units other than dimethylsiloxane units, there being an average of from 1.9 to 2.0 organic groups per silicon atom in the organopolysiloxane polymer block, there being on each organopolysiloxane block at least two silicon-bonded oxygen atoms each having an unsatisfied valence bond which is attached to
(5) a coupling unit, bonded to the organopolysiloxane block (1) through the silicon-bonded oxygen atoms, which have the general formula

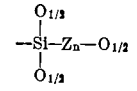

wherein Z is selected from the group consisting of

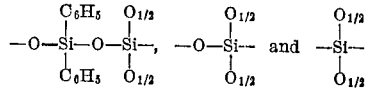

and wherein $n$ is an integer from 0 to 1, the said coupling units joining the organopolysiloxane block (4) to
(6) silicon-containing blocks of the general unit formula R"SiO$_{3/2}$ wherein R" is a monovalent radical selected from the group consisting of aryl, alkaryl and halogenoaryl radicals through the silicon-bonded oxygen atoms of the coupling unit designated as —O$_{1/2}$,
the amount of the organopolysiloxane blocks (4) is from 5 to 99 mol percent and the amount of the silicon-containing blocks of (6) is from 1 to 95 mol percent, both (4) and (6) are based only on the combined amount of (4) and (6).

9. An organopolysiloxane block copolymer of claim 8 wherein $n$ is 0.

10. An organopolysiloxane block copolymer of claim 8 wherein $y$ is 0, $n$ is 0 and $R''$ is phenyl.

11. An organopolysiloxane block copolymer of claim 8 wherein (4) is present in an amount from 10 to 80 mol percent, $n$ is 0, and $R''$ is phenyl.

12. An organopolysiloxane block copolymer of claim 8 wherein (4) is present in an amount from 10 to 80 mole percent, $y$ is 0, $n$ is 0 and $R''$ is phenyl.

13. An organopolysiloxane block copolymer of claim 8 wherein there is an average of from 1.98 to 2.0 organic groups per silicon atom in the organopolysiloxane polymer block (4).

14. An organopolysiloxane block copolymer of claim 13 wherein (4) is present in an amount from 10 to 80 mole percent, $y$ is 0, $n$ is 0, and $R''$ is phenyl.

15. An organopolysiloxane block copolymer of claim 13 wherein (4) is present in an amount of 40 mole percent, $x$ is 34, $y$ is 0, $n$ is 0 and $R''$ is phenyl.

References Cited by the Examiner
UNITED STATES PATENTS

| | | | |
|---|---|---|---|
| 2,486,162 | 10/1949 | Hyde | 260—46.5 |
| 2,567,110 | 9/1951 | Hyde | 260—46.5 |
| 2,637,719 | 5/1953 | Dereich | 260—46.5 |

SAMUEL H. BLECH, *Primary Examiner.*